United States Patent Office 3,676,287
Patented July 11, 1972

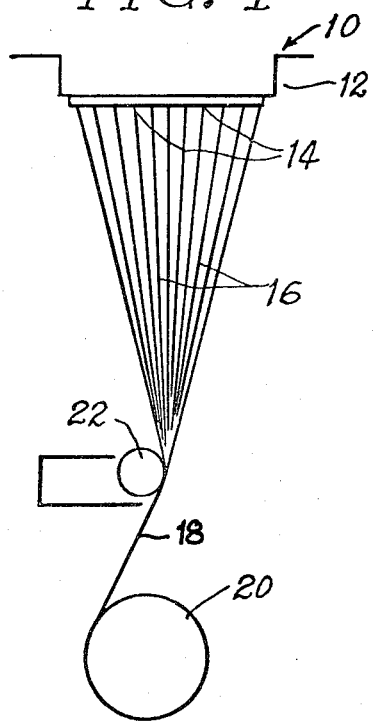
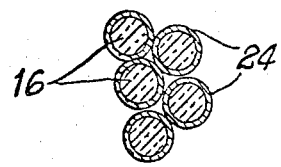
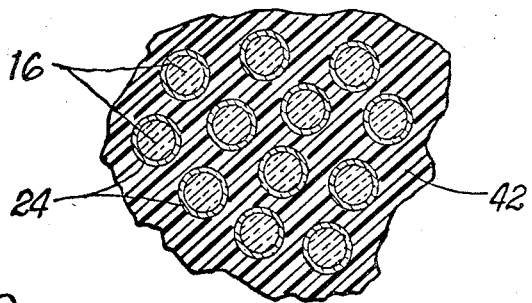
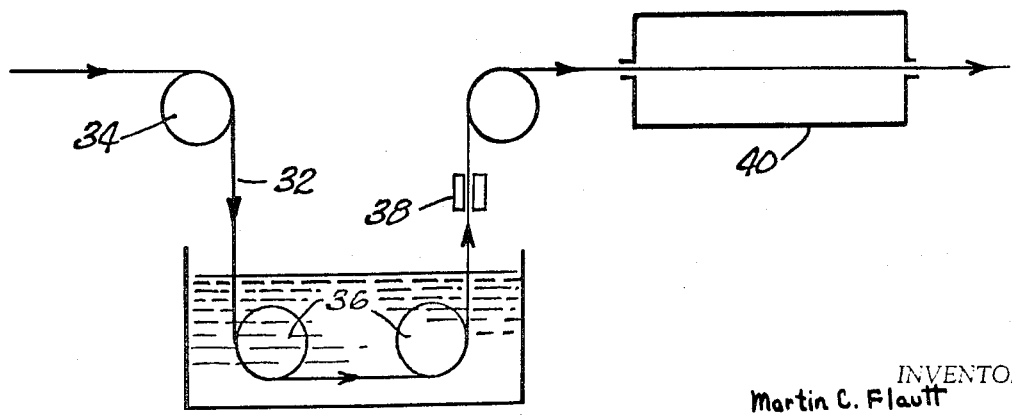

3,676,287
GLASS FIBER-REINFORCED ELASTOMERS
Martin C. Flautt, Granville, Leland G. Moran, Newark, and Frank P. McCombs, Granville, Ohio, assignors to Owens-Corning Fiberglas Corporation
Filed Sept. 8, 1970, Ser. No. 70,252
Int. Cl. B29h 17/28; B32b 25/02
U.S. Cl. 161—140
13 Claims

ABSTRACT OF THE DISCLOSURE

This invention is addressed to the improvement in the bonding relationship of glass fibers with elastomeric materials in the manufacture of glass fiber-reinforced elastomeric products wherein individual glass fibers are treated with a composition including a polyamide, which is preferably a microcrystalline polyamide, a lubricant, an organo silicon compound coupling agent and a gel agent to form a thin coating on the individual glass fibers, and wherein the individually coated glass fibers may be further processed into glass fiber bundles and impregnated with an elastomer compatible material.

---

This invention relates to elastomeric products reinforced or otherwise combined with glass fibers and it relates more particularly to the method and compositions employed in the treatment of the glass fibers to enhance the bonding relationship between the glass fibers and the elastomeric materials for making fuller utilization of the desirable characteristics of the glass fibers in their combination with the elastomeric materials.

The term "glass fibers," as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strand, yarn, cord and fabrics formed thereof.

As used herein, the term "elastomer" is meant to include natural rubber in the cured or uncured stage, vulcanized or unvulcanized stage, and synthetic organic elastomeric materials such as butadiene-styrene copolymer, butadiene-acrylonitrile copolymer, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group number from 2–12 carbon atoms, and polysulfone rubber.

The invention is addressed to the fuller utilization of the desirable characteristics of glass fibers, such as their high strength, flexibility, thermal stability, chemical stability, inertness, electrical resistance and heat conductive characteristics when used in combinations with elastomeric materials as a reinforcement or as a stabilizing agent in belt manufacture, as reinforcing cords and fabrics to increase strength, life wearability and service characteristics in rubber tires, and as a reinforcement and the like in other elastomeric coated fabrics and molded elastomeric products.

It is an object of this invention to provide a new and improved composition which may be used as a forming size for treatment of glass fibers in forming or afterwards to enable fuller utilization to be made of the desirable characteristics of the glass fibers when used in combination with elastomeric materials in the manufacture of glass fiber-reinforced molded products and coated fabrics.

More specifically, it is an object of this invention to provide a composition for use in the treatment of glass fibers in forming to improve the processing and the performance characteristics of the glass fibers as a reinforcement for elastomeric materials to enhance their bonding relationship when used in combination with elastomeric materials in the manufacture of glass fiber-reinforced plastics, laminates or coated fabrics and it is a related object to provide a method and means for making fuller utilization of the strength properties of glass fibers when used as a reinforcement for elastomeric materials.

These and other objects and advantages of this invention will hereinafter appear and, for purposes of illustration, but not of limitation, an embodiment of the invention is shown in the accompanying drawing in which:

FIG. 1 is a flow diagram showing the manufacture of continuous glass fibers and the treatment thereof in forming to improve the processing characteristics of the glass fibers and to improve the performance characteristics of the glass fibers when used in combination with elastomeric materials in the manufacture of glass fiber-reinforced elastomeric products;

FIG. 2 is a flow diagram illustrating the treatment of glass fibers subsequent to their being formed into bundles, strands, yarns, cords or fabrics to impregnate the glass fiber bundles in accordance with the preferred practice of this invention;

FIG. 3 is a cross-sectional view of glass fibers processed in accordance with the diagram illustrated in FIG. 1; and, FIG. 4 is a cross-sectional view of a bundle of glass fibers processed in accordance with the flow diagram of FIG. 2.

To the present, glass fibers which have been added or otherwise incorporated with elastomeric materials, in the form of continuous or chopped fibers, have functioned more or less as a filler than as a reinforcement, or flexibilizing agent, or stabilizing agent. As a result, little, if any, improvements in mechanical and physical properties have been made available from the combinations which made use of glass fibers in products formed of elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

In the processing of glass fibers for use as reinforcements for elastomeric materials, the individual glass fibers are frequently first coated, preferably as they are formed, with a treating composition which serves to form a thin coating thereon and operates to impart to the individual glass fibers a desired balance between lubricity and bonding without destroying the fibrous character and appearance of the fibers. Thereafter, the fibers are preferably plied with other strands and twisted to form yarns, threads or cords which can be used as a reinforcement for elastomeric materials, with or without cutting to shorter lengths, and which can be formed into woven or non-woven fabrics for subsequent combination with elastomeric materials without further processing. Alternatively, after the fibers have been processed into strands, yarns, cords or fabrics, commonly referred to as bundles, the bundles of glass fibers can be further processed to impregnate the bundle with an elastomeric compatible material which serves to further intertie the glass fibers with elastomeric materials in the manufacture of glass fiber-reinforced elastomeric products.

In either case, one of the primary difficulties incurred through the use of treating or sizing compositions heretofore employed is that the thin coating on the individual treated glass fibers has a tendency to be dislodged from the glass fiber surfaces as a result of the random whipping of the glass fibers as they are sized in forming and during subsequent processing of the treated or sized glass fibers, such as during twisting, plying and/or weaving.

It has now been found that a treating composition for use in coating glass fibers formulated of (1) a lubricant, (2) a gel agent, (3) an organo silicon anchoring agent and (4) a polyamide resin, preferably in the form of a nylon, can be employed to provide a thin coating on individual glass fibers which has increased durability and can withstand the twisting, plying and weaving operations commonly used with glass fibers in the manufacture of glass fiber reinforced elastomeric materials without becoming dislodged from the glass fiber surfaces.

The invention will be discussed with reference to a new and improved composition which can be employed as an original size applied to the glass fibers in forming, or afterwards after an originally applied size has been removed to enable fuller utilization to be made of the desirable characteristics of the glass fibers when used in combination with elastomeric materials in the manufacture of glass fiber-reinforced elastomeric products.

As the polyamide resins, use is preferably made of a polyamide formed by the reaction of a diamine containing 1–20 carbon atoms with an aliphatic or aromatic polycarboxylic acid containing 2–20 carbon atoms. A wide variety of diamines can be utilized in forming the polyamide, including aliphatic and aromatic diamines, and most preferably the alkylene diamines. Illustrative of suitable diamines include dimethylene amine, trimethylene amine, tetramethylene diamine, hexamethylene diamine, etc. Illustrative of suitable polycarboxylic acids are malonic acid, succinic acid, glutaric acid, adipic acid, pimelic acid, suberic acid, azelaic acid, maleic acid, glutaconic acid, phthalic acid, etc., as well as the corresponding anhydrides or acid halides.

Representative of suitable polyamide resins are nylon 610, formed by the reaction of hexamethylene diamine and sebacic acid, nylon 66, nylon 7, nylon 9, nylon 11, Sun Kem, which is a flake nylon, manufactured by Sun Chemical Co. as well as a variety of others.

Most preferred polyamide resins or nylons according to the present invention are the microcrystalline nylons, which are crystalline nylons having a very small particle size, generally less than 500 A. Suitable microcrystalline nylons are manufactured by FMC under the trademark Aviamide, such as Aviamide 6 which is an aqueous dispersion having a solids content of about 40% by weight and a particle size within the range of 50 to 100 A. It has been found that microcrystalline polyamides are particularly well suited for use in the present invention since they provide an extremely tough and durable film when present in the thin coating on the glass fiber surfaces.

As the organo silicon coupling agent, use can be made of a very wide variety of silicon-containing coupling agents known to those skilled in the art to be useful for this purpose. In general, suitable organo silicon compounds include organo silanes containing 1 to 3 readily hydrolyzable groups, such as halogen (bromine, chlorine, fluorine or iodine) or alkoxy having 1–8 carbon atoms, such as methoxy, ethoxy, propoxy, butoxy, etc., and containing at least one organic group attached directly to the silicon atom, with any remaining valences on the silicon atom being taken up by hydrogen.

The organic group or groups attached to the silicon atom can be any of a variety of groups including alkyl having 1–10 carbon atoms, such as methyl, ethyl, propyl, hexyl, etc.; alkenyl containing 2–8 carbon atoms, such as vinyl, allyl, etc.; cycloalkyl having 4–8 carbon atoms, such as cyclopentyl, cyclohexyl, etc.; aryl containing 6–15 carbon atoms, such as phenyl, naphthyl, benzyl, etc.; and the halogen, amino, hydroxy or epoxy-substituted derivatives thereof. It will be understood that wherein the organo silane contains more than one organic group, the various organic groups attached to the silicon atom can be the same or different from each other.

Representative of the compounds falling within the above group are ethyldichloro silane, propyltrichloro silane, n-butyltrimethoxy silane, gamma-aminopropyltrimethoxy silane, delta-aminobutyltriethoxy silane, bis-(gamma-aminopropyl)dimethoxy silane, delta-aminobutylethyldimethoxy silane, beta-hydroxyethyltriethoxy silane, glycidoxypropyltrimethoxy silane, gamma-chloropropyltrichloro silane, vinyldichloro silane, gamma-aminoallyltrimethoxy silane, beta-aminovinyltriethoxy silane, 3,4-epoxycyclohexylethyltrimethoxy silane, 3-aminocyclohexylethyltriethoxy silane, para-aminophenyltriethoxy silane, methacryloxypropyltrimethoxy silane, N - (beta-aminoethyl)-gamma-aminopropyltrimethoxy silane as well as a variety of others. In general, those silanes preferred are those in which at least one organic group is substituted by at least one amino group.

One particularly preferred amino-substituted organo silane which has been found to provide excellent results in the practice of the present invention is a compound having the formula:

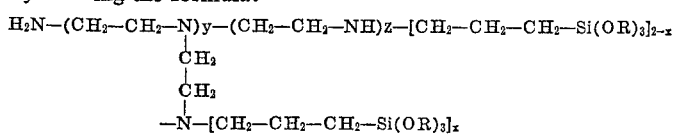

wherein R is lower alkyl (e.g. methyl, ethyl, propyl), $x$ is an integer between zero and 2 and $y$ and $z$ are integers. Compounds of the foregoing type in which R is methyl are available from Dow Corning Corporation under the designation Z-6050.

While the organo silicon compounds suitable for use as a coupling agent in accordance with the present invention have been described above with reference to the organo silane, it will be understood by those skilled in the art that the above may also be used in the form of the corresponding silanols and polysiloxane polymers.

As the gel agent, use can be made of a wide variety of materials having thixotropic properties. For this purpose, use is preferably made of gel agents formed of cellulose or cellulose derivatives, including carboxymethyl cellulose as well as lower alkyl and lower alkylene glycol ethers of cellulose or methyl cellulose. For example, use can be made of the dimethyl ether of cellulose, the diethyl ether of cellulose, etc., wherein the alkyl in the ether contains 1–4 carbon atoms, including methyl, ethyl, propyl, etc. As indicated above, use can also be made of lower alkylene glycol ethers of cellulose and methyl cellulose wherein the glycol forming the ether contains 2–4 carbon atoms, including ethylene glycol, propylene glycol and butylene glycol. Representative of suitable cellulose and cellulose derivatives include dimethyl ether of cellulose, propylene glycol ethers of methyl cellulose, which are marketed by Dow Chemical Company under the trade name Methocel HG, methyl cellulose, which is marketed by Dow under the trade name Methocel MC and butylene glycol ethers of methyl cellulose which are marketed by Dow under the trade name Methocel HB. In addition to the cellulose-type gel agents described above, use can also be made of various other gel agents such as the cross-linked polyacrylamides marketed by Dow Chemical Company under the designation "SA 1300." Similarly, a wide variety of glass fiber lubricants can be used in accordance with the concepts of the present invention. Glass fiber lubricants are well known to those skilled in the art and include fatty acid amines containing 8–36 carbon atoms, such as lauryl amine, stearyl amine, palmityl amine, etc., solubilizable mineral oils, such as sulfonated mineral oils, marketed by Emery (e.g. Twitchell 7440) and amides prepared by the reaction of a fatty acid containing 8–36 carbon atoms, such as lauric acid, palmitic acid, oleic acid, linoleic acid with poly(polyoxyethylene) amines. One of the preferred lubricants for use in the present invention is an amide formed by the reaction of one of the fatty acids above with a polyamine having the formula:

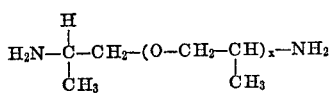

wherein $x$ is an integer. Suitable amines of this type are marketed by Jefferson Chemical and have average molecular weights ranging up to about 2000. The reaction between the fatty acid and the polyamine can be conveniently carried out by admixing the amine with the acid in a molar ratio of at least 2 moles of acid per mole of amine, and heating the mixture to a temperature between 50–100° C. However, it will be understood by those skilled in the art that a wide variety of other glass fiber lubricants in addition to those described above can be used in accordance with the concepts of the present invention. Similarly, it is possible, and sometimes desirable, to use mixtures of the foregoing lubricants.

The relative proportions of the components of the treating composition of the invention are not critical and can be varied within wide ranges. Best results are usually achieved when the composition is formulated in accordance with the following:

| | Parts by wt. |
|---|---|
| Polyamide | 20–150 |
| Lubricant | 10–160 |
| Coupling agent | 10–60 |
| Gel agent | 5–150 |

Water is generally added to the foregoing materials to provide an aqueous dispersion having a solids content within the range of 1–20% solids by weight.

Having described the basic concepts of the invention, reference is now made to the following specific examples which are provided by way of illustration, but not of limitation, of compositions embodying the features of the invention as well as the application of the composition to glass fibers to form a thin casting thereon.

EXAMPLE 1

This example illustrated the use of a flake nylon (Sun Kem from the Sun Chemical Co.) as the film-forming component of the composition.

A glass fiber lubricant is prepared by reacting 1000 g. of a polymeric polyamine having an average molecular weight of 2000 and having the formula:

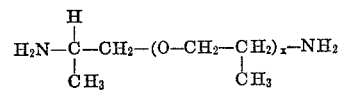

(Jeffamine 2000 from Jefferson Chemical Co.) with 810 g. of oleic acid at 80° C. for about 3 hours. Thereafter, the reaction mixture is held at 78 to 80° C. for about 30 minutes, and is then allowed to cool to room temperature. The result is an amide lubricant.

60 g. of a flake polyamide (Sun Kem nylon) is dispersed in a solvent by admixing the nylon particles with 100 g. of ethyl chloride and 70 g. of n-butanol. 25 g. of this nylon dispersion is then mixed with 100 g. of the amide lubricant prepared by the reaction of the above polyamine and oleic acid, while maintaining the mixture at a temperature within the range of 35 to 40° C.

The resulting amide lubricant nylon mixture is then formulated into the following treating composition:

| | Parts by wt. |
|---|---|
| Nylon polyamide dispersion | 20 |
| Amide lubricant | 80 |
| Polyamino silane (Z6050–Dow Corning) | 30 |
| Hydroxy propyl methyl cellulose (Methocel HG 90 DGS) | 15 |
| Deionized water | 2900 |

The above composition can be applied to glass fibers, preferably as a size as the glass fibers are being formed, or after a previously applied size has been removed.

Referring now to the schematic diagram of FIG. 1, the glass is melted in a glass melting furnace 10 having a bushing 12 on the bottom side. The bushing is formed with a plurality of openings extending therethrough and the molten glass flows gravitationally through the hundreds of small openings in the bushing to form therein streams 14 which are rapidly attenuated into fine glass filaments 16 by winding the filaments about a rapidly rotating drum 20. The filaments 16 are sized with the composition of Example 1 as they are gathered together to form a strand. For this purpose, use is made of an applicator 22 which is illustrated as a wiping pad that is constantly wet with the forming size composition. The filaments of glass are each wet with the size composition as they are gathered together to form the stand 18 that is wound about the drum 20.

The sized strands are allowed to air dry or drying of the thin size coating can be accelerated by exposure to elevated temperature such as a temperature within the range of 150° to 500° F. The applied size forms a very thin coating 24 on the surface of the glass fibers 16 to impart a desired balance of lubricity and bonding without destroying the fibrous characteristic or appearance of the fiber.

The strand 18 of sized glass fibers is preferably plied with other strands and twisted to form yarns, threads or cords which may be used as a reinforcement for elastomeric materials, with or without cutting to shorter lengths, and which can be formed into woven or nonwoven fabrics for subsequent combination with elastomeric materials.

EXAMPLE 2

This example illustrates the use of the amide lubricant-polyamide mixture prepared in Example 1.

A mixture of 50 ml. of NH₄OH, 30 g. of a polyamino organo silane (Z 6050 from Dow-Corning), 22.5 g. of a sulfonated mineral oil lubricant (Twitchell 7440 from Emery Chemicals) and 10 g. of a hydroxypropyl methyl cellulose (Methocel HG 90 DGS from Dow Chemical Co.) are prepared in 2900 g. of deionized water.

Thereafter, the mixture is added to 174 g. of the amide lubricant-nylon mixture prepared in Example 1 to form the following composition:

| | Parts by wt. |
|---|---|
| Nylon polyamide dispersion | 34.8 |
| Amide lubricant | 139.2 |
| Polyamino organo silane | 30.0 |
| Sulfonated mineral oil lubricant | 22.5 |
| Hydroxypropyl methyl cellulose | 10.0 |
| NH₄OH | 30.1 |
| Water | 2900.0 |

The foregoing composition can be applied to glass fibers as they are formed, or afterwards, to form a thin coating thereon, in the manner described in Example 1 in which the coating constitutes between 1 and 12% by weight of the treated glass fibers.

Additional examples of this concept of the invention are illustrated as follows. In each of the examples, the procedure of Example 2 is used except that the polyamino organo silane used in Example 2 is replaced by the silane indicated.

EXAMPLE 3

| | Parts by wt. |
|---|---|
| Nylon polyamide dispersion | 34.8 |
| Amide lubricant | 139.2 |
| Gamma-aminopropyltriethoxy silane | 30.0 |
| Sulfonated mineral oil lubricant | 22.5 |
| Hydroxypropyl methyl cellulose | 10.0 |
| NH₄OH | 30.1 |
| Water | 2900.0 |

EXAMPLE 4

| | Parts by wt. |
|---|---|
| Nylon polyamide dispersion | 34.8 |
| Amide lubricant | 139.2 |
| Vinyl trimethoxy silane | 30.0 |
| Sulfonated mineral oil lubricant | 22.5 |
| Hydroxypropyl methyl cellulose | 10.0 |
| NH₄OH | 30.1 |
| Water | 2900.0 |

EXAMPLE 5

| | Parts by wt. |
|---|---|
| Nylon polyamide dispersion | 34.8 |
| Amide lubricant | 139.2 |
| Polysiloxane polymer of gamma-aminopropyltrimethoxy silane (avg. MW 460) | 30.0 |
| Sulfonated mineral oil lubricant | 22.5 |
| Hydroxypropyl methyl cellulose | 10.0 |
| NH₄OH | 30.1 |
| Water | 2900.0 |

EXAMPLE 6

This example illustrates the use of microcrystalline nylon in the composition of the invention.

A mixture comprising 30.0 parts by weight of sulfonated mineral oil, 40.0 parts by weight of polyamino organo silane Z–6050, 12.0 parts by weight of cross-linked polyacrylamide (SA 1300) and 800 parts by weight hydroxypropyl methyl cellulose (Methocel HG–90 DGS) is prepared in 2318 parts by weight water. Thereafter, the mixture is slowly admixed with 800 parts by weight of an aqueous dispersion of a microcrystalline nylon having a solids content of 40% by weight and particle sizes within the range of 50 to 100 A (Aviamide-6 from FMC).

The resulting composition contains the following.

| | Parts by wt. |
|---|---|
| Microcrystalline nylon (40% solids) | 800.0 |
| Sulfonated mineral oil | 30.0 |
| Polyamino organo silane | 40.0 |
| Cross-linked polyacrylamide | 12.0 |
| Hydroxypropyl methyl cellulose | 800.0 |
| Water | 2318.0 |

The foregoing composition can be applied to individual glass fibers in forming, or afterwards after a previously applied size has been removed in the manner described in Example 1. Application should be made in an amount to deposit dry solids constituting between 1 and 12% by weight of the coated glass fibers.

After application of the above composition, depending somewhat upon the properties desired in the coated glass fibers, it is frequently advisable to heat the coated glass fibers to a temperature of at least equal to the melting point of the polyamide (194° C. for Aviamide-6) to thereby melt the polyamide and causing it to form a tough adherent film on the glass fiber surfaces. This heating step can frequently, if desired, be conveniently carried out as part of the drying of glass fibers coated with compositions of the invention.

EXAMPLE 7

An amide lubricant is prepared by reacting a polymeric polyamine having an average molecular weight of 400 and having the formula:

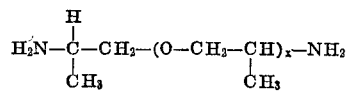

with stearic acid in a mole ratio of amine to acid of about 4:1.

The resulting amide is mixed with a microcrystalline nylon, and is formulated into the following composition.

| | Parts by wt. |
|---|---|
| Microcrystalline nylon dispersion (Aviamide-6) | 300.0 |
| Sulfonated mineral oil | 22.5 |
| Polyamino organo silane | 30.0 |
| Hydroxypropyl methyl cellulose | 600.0 |
| Amide lubricant | 60.0 |
| Water | 1987.0 |

EXAMPLE 8

The procedure of Example 6 is repeated except that the coupling agent is N-(beta-aminoethyl)-gamma-aminopropyltrimethoxy silane.

| | Parts by wt. |
|---|---|
| Microcrystalline nylon | 700.0 |
| Sulfonated mineral oil | 30.0 |
| N - (beta-aminoethyl)-gamma-aminopropyltrimethoxy silane | 40.0 |
| Cross-linked polyacrylamide | 12.0 |
| Hydroxypropyl methyl cellulose | 600.0 |
| Water | 2100.0 |

EXAMPLE 9

The procedure of Example 6 is repeated except that the lubricant is a laurylamine acetate (Nopcogen 16 L) and the coupling agent is a polysiloxane formed of gamma-aminopropyltrimethoxy silane having an average molecular weight of 460.

The composition is formulated as follows:

| | Parts by wt. |
|---|---|
| Microcrystalline nylon | 600.0 |
| Lauryl amine acetate (Nopcogen 16 L) | 40.0 |
| Polysiloxane | 40.0 |
| Cross-linked polyacrylamide | 600.0 |
| Water | 2300.0 |

The compositions of Examples 7 to 9 can be applied to glass fibers in accordance with the method schematically illustrated in FIG. 1 of the drawing.

In accordance with another concept of the present invention, the treating compositions of Examples 7 to 9 can be modified to include one or more elastomer compatible materials including, for example, resorcinol aldehyde latices and/or vinyl pyridine-butadiene-styrene terpolymer latices. Suitable resorcinol aldehyde resins and combinations thereof with natural rubber latex are marketed by the U.S. Rubber Company under the trade name "Lotol 5440." For the preparation of such materials, reference can be made to Canadian Pat. No. 435,754 wherein description is made of the reaction of resorcinol and formaldehyde in the presence of a substantial amount of short-chained alkylamines for the purpose of stabilizing the reaction and the products formed therefrom, as well as a description of the combination of the formed resin with rubber latex. Suitable vinyl pyridine-butadiene-styrene terpolymers are marketed in the United States by General Tire and Rubber Co. under the designation "A-12-30," by Firestone under the trade name SR 5749 and by GAF Corporation under the designation "AT 743."

This concept of the invention may be represented by the following examples:

EXAMPLE 10

| | Parts by wt. |
|---|---|
| Polyamide | 20–150 |
| Elastomer compatible material | 5–100 |
| Lubricant | 10–160 |
| Coupling agent | 10–60 |
| Gel agent | 5–150 |

Water is generally added to the foregoing materials in an amount sufficient to provide an aqueous dispersion having a solids content within the range of 1–20% by weight.

EXAMPLE 11

| | Parts by wt. |
|---|---|
| Polyamide (Sun Kem nylon) | 35.0 |
| Amide lubricant | 130.0 |
| Polyamino organo silane (Z-6050 from Dow Corning) | 30.0 |
| Sulfonated mineral oil lubricant | 20.0 |
| Hydroxypropyl methyl cellulose | 15.0 |
| Natural rubber latex-resorcinol formaldehyde resin (38% solids—"Lotol 5440") | 30.0 |
| Water | 2500.0 |

In preparing the above composition, the procedures utilized in Example 1 is employed in which the components, except for the amide lubricant and the polyamide are admixed together. Thereafter, the amide-polyamide mixture is added.

EXAMPLE 12

| | Parts by wt. |
|---|---|
| Microcrystalline nylon (40% solids) | 700.0 |
| Sulfonated mineral oil | 30.0 |
| Polyamino organo silane (Z-6050) | 40.0 |
| Cross-linked polyacrylamide | 12.0 |
| Hydroxypropyl methyl cellulose | 700.0 |
| Natural rubber latex-resorcinol formaldehyde resin (38% solids—"Lotol 5440") | 50.0 |
| Water | 2500.0 |

In formulating the above treating composition, the procedure of Example 6 is used wherein the components, except the nylon, are mixed, and the resulting mixture is combined with the nylon. The composition can then be applied to glass fibers in the manner described in Example 1 to form a tough thin coating thereon.

EXAMPLE 13

The procedure utilized in Example 12 is used in this example in formulating the following composition.

| | Parts by wt. |
|---|---|
| Microcrystalline nylon (40% solids) | 700.0 |
| Sulfonated mineral oil | 30.0 |
| Polyamino organo silane (Z-6050) | 40.0 |
| Hydroxypropyl methyl cellulose | 700.0 |
| Vinyl pyridine-butadiene-styrene terpolymer (Firestone terpolymer SR 5749) | 50.0 |
| Water | 2500.0 |

EXAMPLE 14

The procedure of Example 12 is again repeated to provide the following composition.

| | Parts by wt. |
|---|---|
| Microcrystalline nylon (40% solids) | 750.0 |
| Fatty acid amine (Nopcogen 16 L) | 30.0 |
| Polysiloxane polymer of gamma-aminopropyltrimethoxy silane (avg. MW 440) | 50.0 |
| Hydroxy propyl methyl cellulose | 650.0 |
| Vinyl pyridine - butadiene - styrene terpolymer (GAF terpolymer AT 743) | 40.0 |
| Water | 2500.0 |

The compositions of Examples 13 and 14 can be applied to individual glass fibers in the manner described in Example 1 to form a thin coating thereon constituting between 1–12% by weight.

In accordance with still a further concept of the present invention, after the glass fibers, coated with one of the compositions of Examples 1–14, have been processed into strands, yarns, cords or fabrics, hereinafter referred to as bundles, the bundles of coated glass fibers can be impregnated with an elastomer compatible material which operates to intertie the coated glass fibers with elastomeric materials when the glass fibers are combined with elastomeric material in the manufacture of glass fiber-reinforced elastomeric products. This concept may be represented by the following examples.

EXAMPLE 15

Glass fibers are sized in forming with the composition described in Example 1 in accordance with the method described in Example 1. The coated glass fibers are then formed into a bundle of a plurality of glass fibers, which is impregnated with the following impregnating composition.

Impregnating composition

| | Parts by wt. |
|---|---|
| Natural Rubber Latex-Resorcinal formaldehyde resin (38% solids—"Lotol 5440") | 30 |
| Water | 70 |

Impregnation with the aqueous composition of Example 15 can be made by conventional means such as by immersion of the bundles in a bath of aqueous impregnating composition. Referring more specifically to FIG. 2 of the drawing, the glass fiber bundle 32 is advanced over a guide roller 34 for passage downwardly into the bath 35 containing the impregnating composition of Example 4. The bundle is then turned under roller 36 to effect a sharp bend which operates to open the bundle to enable fuller penetration of the aqueous impregnating composition into the bundle of sized fibers for fuller impregnation of the bundle. The impregnated bundle is then raised from the bath for passage through a roller or die 38 which operates to remove excess impregnating composition from the bundle and to work the impregnating composition into the bundle. Thereafter, the endless bundle is advanced over the roller 39 into a drying oven 40 preferably in the form of an air drying oven maintained at a temperature above ambient temperature and preferably at a temperature within the range of 150° to 350° F. to accelerate removal of the aqueous diluent and to set the impregnating material in situ in the glass fiber bundle. Drying will occur in a relatively short period of time, ranging from 1 to 30 minutes, depending somewhat upon the temperature of drying.

The elastomer compatible material is applied to the glass fiber in an amount to impregnate with a dry solids content of 5–25% by weight of the glass fiber system, and preferably 10–15% by weight.

The resulting impregnated bundle is shown in FIG. 4 of the drawing wherein the individual glass fibers 16 contain a thin size coating 24 thereon formed from the composition of Example 1, and the impregnant 42 which substantially completely penetrates the glass fiber bundle to separate the individual glass fibers each from the other.

Additional examples of this concept of the invention include the following.

EXAMPLE 16

Individual glass fibers are sized in forming with the composition of Example 6 to form a thin coating thereon. Thereafter, the sized glass fibers are impregnated with the aqueous impregnating composition utilized in Example 15.

EXAMPLE 17

In this example, individual glass fibers are coated with the composition of Example 7, and are thereafter impregnated with the following impregnating composition.

Impregnating composition

| | Parts by wt. |
|---|---|
| Vinyl pyridine-butadiene-styrene terpolymer latex (50% solids—Firestone terpolymer SR 5749) | 35 |
| Water | 65 |

Application of the foregoinng impregnating composition is made in the same manner as described in Example 15 to provide an impregnated bundle of the type illustrated in FIG. 4 of the drawing.

The impregnating compositions for use in this concept of the present invention are preferably aqueous dispersions of elastomer compatible material. In general, use is preferably made of an impregnating composition having a solids content within the range of 10–50% solids by weight.

It will also be understood that mixtures of the elastomer compatible impregnated materials described above may be used in accordance with this concept of the present invention, as represented by the following example.

EXAMPLE 18

In this example, individual glass fibers are coated with the composition of Example 6 to form a thin coating thereon, and thereafter twisted to provide up to 2.0 twists per inch, and are thereafter impregnated with the following composition.

| | Parts by wt. |
|---|---|
| Natural rubber latex-Resorcinol formaldehyde resin (38% solids—"Lotol 5440") | 10–50 |
| Vinyl pyridine-butadiene-styrene terpolymer latex- (50% solids—Firestone terpolymer SR 5749) | 15–50 |

Water should be incorporated with the foregoing material to provide an aqueous dispersion having a solids content of 10–15% by weight. Application should be made in an amount sufficient to deposit dry solids constituting between 10–25% by weight, and preferably 10–15% by weight.

It is desirable to achieve as full impregnation as possible into the bundles of glass fibers in order more effectively to separate the fibers one from the other by the impregnating materials since the solids are effective as a coating on the glass fibers to cushion the fibers and to protect the fibers against destruction by mutual abrasion. Thus, it is desirable to achieve as deep penetration as possible with the impregnating composition into the glass fiber bundle. The deeper the penetration, the more effective will be the bond between the glass fibers in the bundle and the elastomeric material with which the bundles of glass fibers are combined in the subsequent manufacture of the glass fiber-elastomeric product.

In the final system, the elastomeric material with which the glass fibers are combined will constitute a continuous phase. Such continuous phase of elastomeric material may comprise rubbers of the type incorporated into the impregnating composition or the elastomeric material can differ therefrom. The continuous phase of elastomeric material can be employed in the cured or uncured state or in the vulcanized or unvulcanized state. It is believed that the tie-in between the impregnated bundles of glass fibers and the elastomeric material forming the continuous phase will occur primarily during cure or vulcanization of the elastomeric material during the fabrication of the elastomeric material.

When the individual glass fibers are coated with a composition embodying the features of the present invention, the coated glass fibers can be processed directly into yarns, strands, cords or fabrics, or used alone in combination with elastomeric material without the need for impregnation of bundles of glass fibers since the individual glass fibers 16 of the bundle, as shown in FIG. 3, are already provided with a coating 24 formulated to contain the desired components for anchoring with elastomeric material and for protecting the glass fibers to enhance the processing and performance characteristics.

In fabricating the combinations of the glass fibers treated in accordance with the practice of this invention, with elastomeric materials, the glass fibers or bundles of glass fibers are mixed with elastomeric material or otherwise laid down in the desired arrangement for combination with the elastomeric material as in the manufacture of glass fiber reinforced belts or in the manufacture of rubber tires reinforced with cords of glass fibers. The combination of glass fibers and elastomeric material are processed in a conventional manner by molding or cure under heat and compression or by vulcanization for advancement of the elastomeric material to a cured or vulcanized stage while in combination with the treated glass fibers whereby the glass fibers or bundles of glass fibers become strongly integrated with the elastomeric material in the glass fiber-elastomeric product.

It will be apparent that we have provided a new and proved composition for use in the treatment of glass fibers and bundles of glass fibers to enhance their integration with elastomeric materials in the manufacture of glass fiber-elastomeric products.

It will be understood that invention exists not only in the composition for use in the treatment of the glass fibers to prepare the glass fibers for combinations with elastomeric materials but that invention exists also in the process in which the compositions are employed in the treatment of glass fibers as well as the treated or impregnated glass fiber products formed thereof.

It will be understood that changes may be made in the details of formulation and methods of application or use without departing from the spirit of the invention, especially as defined in the following claims.

We claim:

1. A glass fiber bundle comprising a plurality of glass fibers having a thin coating, said coating comprising a mixture of a polyamide, a glass fiber lubricant, a coupling agent and a gel agent, and an impregnant in said bundle, said impregnant comprising an elastomer compatable material.

2. A glass fiber bundle as defined in claim 1 wherein said polyamide is a microcrystalline nylon.

3. A glass fiber bundle as defined in claim 1 wherein said coupling agent is an organo silicon compound.

4. A glass fiber bundle as defined in claim 1 wherein said gel agent is selected from the group consisting of a cellulose gel agent and a cross-linked polyacrylamide gel agent.

5. A glass fiber bundle as defined in claim 1 wherein said polyamide is formed by the reaction of a diamine containing 1–20 carbon atoms with an acid selected from the group of aliphatic and aromatic polycarboxylic acids containing 2–20 carbon atoms.

6. A glass fiber bundle as defined in claim 1 wherein said polyamide is a microcrystalline nylon having particle sizes less than 500 A.

7. A glass fiber bundle as defined in claim 6 wherein said nylon has a particle size within the range of 50 to 100 A.

8. A glass fiber bundle as defined in claim 1 wherein said coupling agent is selected from the group consisting of organo silanes containing 1 to 3 readily hydrolyzable groups and containing at least one organic group attached directly to the silicon atom with any remaining valences being taken up by hydrogen, their corresponding silanols and polysiloxane polymers.

9. A glass fiber bundle as defined in claim 1 wherein said coupling agent is an organo silicon compound having the formula:

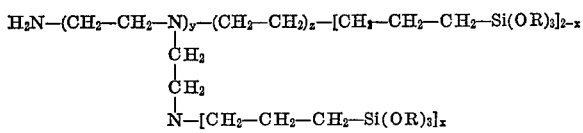

wherein R is lower alkyl, $x$ is an integer from zero to 2 and $y$ and $z$ are integers.

10. A glass fiber bundle as defined in claim 1 wherein said gel agent is selected from the group consisting of carboxymethyl cellulose, lower alkyl and lower alkylene glycol ethers of cellulose and methyl celluose, cross-linked polyacrylamides and mixtures thereof.

11. A glass fiber bundle as defined in claim 1 wherein said lubricant is selected from the group consisting of fatty acid amines, solubilized mineral oils and amides formed by the reaction of a fatty acid with a polyamine having the formula:

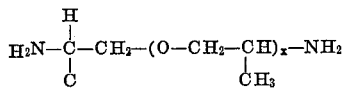

wherein $x$ is an integer.

12. A glass fiber bundle as defined in claim 1 wherein said composition contains 20 to 150 parts by weight of the polyamide, 10 to 160 parts by weight of the lubricant, 10 to 60 parts by weight of the coupling agent and 5 to 150 parts by weight of the gel agent.

13 A glass fiber bundle as defined in claim 1 wherein said elastomer compatible material is selected from the group consisting of resorcinol formaldehyde latex, vinyl pyridine-butadiene-styrene terpolymer latex and mixtures therefo.

References Cited
UNITED STATES PATENTS 3,252,278   5/1966   Marzocchi et al. ___ 156—308 X
3,544,421   12/1970  Griffith _____ 161—175 X WILLIAM A. POWELL, Primary Examiner U.S. Cl. X.R.

57—153, 164; 117—126; 161—93, 144, 176